Patented Feb. 13, 1945

2,369,504

UNITED STATES PATENT OFFICE 2,369,504

FORMALDEHYDE POLYMERS

Joseph Frederic Walker, Lewiston, N. Y., assignor to E. I. du Pont de Nemours & Company, Wilmington, Del., a corporation of Delaware No Drawing. Application April 24, 1942,
Serial No. 440,349

9 Claims. (Cl. 260—606)

This invention relates to formaldehyde polymers and more particularly to certain hydrated polymeric formaldehyde products and their preparation.

The present products are linear polymers containing small amounts of acid which may or may not be chemically combined with the polymer. They differ from commercial paraformaldehyde in possessing a substantially lower chemical reactivity, a higher melting range and dissolve in water at a much lower rate. Higher molecular weight polymers such as the alpha and beta polyoxymethylenes have such a low rate of solution that for practical purposes they are generally regarded as being almost completely insoluble in water. They have higher melting points and a much lower reactivity.

In general, hydrated linear formaldehyde polymers have the type formula $(CH_2O)_n H_2O$ and are believed to consist of long chain molecules containing one molecule of combined water possessing the structure shown below:

In some cases the combined water may be replaced by other polar molecules such as $CH_3OH$, $H_2SO_4$, etc, and it is possible that the acid present in the products herein described may be so combined, as indicated in the following examples involving sulfuric acid:

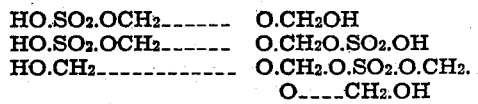

Commercial paraformaldehyde and the alpha and beta polyoxymethylenes are believed to be mixtures of hydrated polymer molecules of various degrees of polymerization. Their molecular weight values and degrees of polymerization are not accurately determinable but relative values are indicated by such properties as melting points, rate of solution, chemical reactivity and water content. Paraformaldehyde is recognized as a relatively low molecular weight product since it melts at relatively low temperatures, e. g., 115–150° C., dissolves in water at a comparatively rapid rate, usually contains approximately 4–5% of water and is highly reactive. The polyoxymethylenes are recognized as high molecular weight products since they melt at 170–175° C., dissolve so slowly in water that for practical purposes they may be considered as substantially completely insoluble, contain approximately 1% or less of water and are extremely unreactive.

It is an object of this invention to provide linear, hydrated, polymeric formaldehyde products which contain small amounts of acids which may or may not be chemically combined, and to provide a practical method for obtaining such products. Other objects will be apparent from the ensuing description of the invention.

The above objects are accomplished in accordance with the invention by evaporating an aqueous formaldehyde solution containing a small amount of a strong, non-volatile, non-reactive acid and recovering the polymer as a residue from the evaporation treatment. The term "strong acid" is used to mean an acid having an ionization constant of at least $1 \times 10^{-2}$. The term "non-volatile acid" is used to mean an acid which will not be removed from the formaldehyde solution during the evaporation treatment at the temperatures employed, e. g., at 50–100° C.

Paraformaldehyde is usually produced by vacuum distillation of ordinary formaldehyde solutions, the paraformaldehyde remaining as a distillation residue. Alpha polyoxymethylene is prepared by an acid precipitation method which involves adding to an aqueous solution of formaldehyde of about 37.5 concentration a large amount of concentrated sulfuric acid, e. g., one volume of acid to ten volumes of formaldehyde solution, the mixture being cooled during the addition. After standing for several hours at ordinary or lower temperatures, the precipitated polymer is isolated by filtration and dried. Beta polyoxymethylene is prepared by a similar method involving the use of still larger proportions of concentrated sulfuric acid.

The present process differs in an essential manner from the method heretofore employed for the production of alpha and beta polyoxymethylenes in that only a small amount of a strong acid is used, which amount is not added for the purpose of precipitating directly a polymer upon addition of the acid, but for the purpose of controlling the polymerization during evaporation. The process differs in an essential manner from the vacuum evaporation method for the production of paraformaldehyde in that evaporation is carried out in the presence of an amount of a strong acid sufficient to affect to a substantial extent the degree of polymerization during evaporation. Ordinary formaldehyde solutions usually contain small amounts of formic acid. Formic acid, however, is not effective for the present purpose and its presence in amounts corresponding to those of strong, non-volatile, non-reactive acids which are effective for the present purpose, does not change to any substantial extent the type or properties of the polymer formed upon evaporation.

Examples of strong non-volatile acids which are suitable for the present use are: dichloracetic, maleic, oxalic, phosphoric, pyrophosphoric, sulfuric and trichloracetic acids. Of such acids, the use of sulfuric, phosphoric, or oxalic acid is preferred. In addition to such acids, acid salts, e. g. potassium acid sulfate, of polybasic acids having an ionization constant for the second hydrogen atom of $1 \times 10^{-2}$ or greater may also be used. Strong acids such as hydrochloric acid which are volatile at temperatures up to 100° C. are not suitable for the present purpose since they are removed during the evaporation treatment.

Acids which react with formaldehyde or the formaldehyde polymer during the evaporation treatment to such an extent that the concentration of the acid is reduced to zero or to a value below the minimum effective concentration, i. e., below about 0.01% by weight based upon the formaldehyde content, are of course ineffective for the present purpose. Such an acid is nitric acid. Accordingly, in addition to being strong and non-volatile, an acid to be suitable for the present purpose must also be non-reactive towards formaldehyde and the formaldehyde polymer under the conditions employed. By "non-reactive," it is not meant that the acid may not react in some loose or reversible manner with the formaldehyde, but rather that it does not react in such a way as to result in a complete destruction of the acid or a reduction in its concentration below the minimum effective value.

Only a small amount of the acid should be used in carrying out the process. Amounts within the range 0.01 to 0.3% by weight, based upon the weight of the formaldehyde present in the solution being evaporated, may be employed with good results, atlhough the preferred amounts will fall within the range 0.05 to 0.15%. Amounts in excess of 0.3% are unsuitable since they do not permit effective control of the polymerization and result in the precipitation of unreactive, insoluble products such as alpha polyoxymethylene. Amounts less than 0.01% are insufficient to affect to any substantial extent the polymerization reaction or the type of polymer produced. The acid may be added to the formaldehyde solution at any time during evaporation prior to the point at which precipitation of solid polymer becomes substantial. Good results may be obtained by adding the acid to, for example 37% formaldehyde solution prior to the evaporation treatment, but best results follow the addition of the acid to the formaldehyde when a formaldehyde concentration of 65-80% has been reached. Regardless of when the acid is added, the amount added should fall within the limits above specified, such amounts being based upon the weight of the formaldehyde actually present in the solution.

Any aqueous formaldehyde solution may be employed but solutions of at least 30%, preferably 40 to 60%, concentration are most suitable. Solutions which are substantially free from methanol are preferred.

It is preferred that evaporation of the formaldehyde solution be effected under reduced pressure since temperatures in excess of 100° C. should not be employed. Evaporation under conditions such that the final temperature of the product will fall within the range 50-100°, and preferably 70-95° C., gives good results, the pressure on the system being reduced sufficiently to permit evaporation at those temperatures. Evaporation under reduced pressure is, however, not essential and any method which will permit removal of water at a practical rate at a temperature of 50-100° C. may be used. Thus a liquid, e. g., ethyl acetate, which forms an azeotrope with water which boils below 100° C. at atmospheric pressure may be added to the formaldehyde solution and the mixture then subjected to evaporation at atmospheric pressure. Under such conditions the temperature of evaporation will be substantially the boiling point of the azeotropic mixture so that unduly high temperatures will be avoided.

The small amounts of strong acid appears to function in the present process as a polymerization catalyst. The acid may react with the formaldehyde or the formaldehyde polymer to some extent. However, any such reaction which may occur appears to be in the nature of a loose combination. The action of the acid is selective in the sense that polymers of extremely high molecular weights such as the alpha and beta polyoxymethylenes, and polymers of low molecular weight such as paraformaldehyde are not produced by the present methods.

It will be apparent from a comparison of the properties of the present products with those of paraformaldehyde and alpha polyoxymethylene, as shown in the following table, that the present products are quite different from either paraformaldehyde or alpha polyoxymethylene:

|  | Melting range, °C. | Solubility, percent | Glue coagulation value expressed in minutes at 60° C. | Percent $CH_2O$ |
|---|---|---|---|---|
| Paraformaldehyde | 115-150 | 3-15 | 10-70 | 95-96 |
| Present products | 160-170 | 0.5-1.5 | 90-250 | 95-97 |
| α-Polyoxy-methylenes | 170-175 | 0.0-0.1 | <350 | 99-99.9 |

The above values for paraformaldehyde are representative for product prepared by vacuum evaporation to dryness of a 37% formaldehyde solution substantially free from methanol. The values for alpha polyoxymethylene are representative for product prepared by adding 40 cc. of concentrated sulfuric acid to 400 cc. of 37% formaldehyde solution substantially free from methanol. The acid is added gradually with sufficient cooling to keep the mixture at or below 40° C. After standing over night at room temperature the precipitated polymer is removed by filtration, washed successively with water, alcohol, and ether and finally dried over calcium chloride in a vacuum desiccator. This general method of preparation is reported by Staudinger, Annalen 474, 251.

The melting points of the products in the above table and in the following examples were all determined in sealed tubes. The water solubility or, more properly, solution rate values set forth represent the amount of formaldehyde, expressed in per cent by weight, which is dissolved in 25 cc. of distilled water when a 5 g. sample of material is agitated with 25 cc. of distilled water for one hour at room temperature. All such values herein reported were determined under substantially identical conditions. The glue coagulation values are a measure of the chemical reactivities of the various samples. They were determined by adding 5 g. of the formaldehyde polymer suspended in 7 cc. of water to a glue solution containing 50 g. of a high grade, commercial, flake glue and 2.75 g. of oxalic acid in 105 cc. of distilled water maintained at 60° C. The glue solution containing the formaldehyde polymer was agitated occasionally until the glue was coagulated. The coagulation time at 60° C. expressed in minutes is taken as the "glue coagulation value." This method of determining the reactivity of formaldehyde polymers is described by Browne and Hrubesky in the Journal of Industrial and Engineering Chemistry 19, 218 (1927).

The invention is further illustrated by the following examples:

Example 1

A charge of 12.94 kg. of 36.5% formaldehyde solution plus 7.0 gms. of concentrated sulfuric acid (95.5%), dissolved in 50 cc. of water, was placed in an evaporation vessel provided with a kneader type agitator, a steam jacket and a condenser. The charge was subjected to distillation at a pressure of 140–160 mm. until a residue of solid polymer remained in the still. During the latter stages of the evaporation when the mixture became viscous, the agitator was operated and remained in operation until evaporation was completed. The product was then cooled by running cold water through the steam jacket. The quantity of sulfuric acid employed was 0.14% of the weight of the formaldehyde in the charge.

The resulting product contained 97% formaldehyde by analysis, melted at 162–170° C., had a water solubility of 0.6% and glue coagulation value of 225.

Example 2

3.9 g. of oxalic acid dissolved in 35 cc. of water were added to 13 kg. of 36.6% formaldehyde solution. The oxalic acid amounted to 0.08% of the weight of the formaldehyde. The formaldehyde solution containing the oxalic acid was evaporated in the manner described in Example 1 to yield a product containing 96.2% formaldehyde which melted at 162–167° C., had a water solubility of 0.9% and a glue coagulation value of 105.

Example 3

A charge of 13 kg. of 35% formaldehyde was evaporated as in Example 1 until the evaporator residue was a clear solution containing 69% formaldehyde. There was then added 3 g. of 85% phosphoric acid dissolved in 50 cc. of water and the evaporation then continued at 140–160 mm. pressure until a dry product resulted. The phosphoric acid employed corresponded to 0.056% by weight of the formaldehyde in the original charge. The final product contained 95.7% formaldehyde, melted at 164–168° C., had a water solubility of 1.5% and a glue coagulation value of 90 minutes.

For comparison purposes a formaldehyde solution was converted to paraformaldehyde by substantially the same method described in Example 1 except that no acid was added. The paraformaldehyde obtained contained 95% formaldehyde, melted at 123–129° C., had a water solubility of 3.3% and a glue coagulation value of 33. Similar experiments carried out using citric acid and formic acid in place of the strong, non-volatile acids shown in Examples 1–3, gave products which, like paraformaldehyde, were quite soluble in water, had low melting points and low coagulation values, showing that such acids are distinctly not the equivalents of the acids used in Examples 1–3 and are not suitable for the present purpose.

There are many applications where a formaldehyde polymer which is less reactive than paraformaldehyde is desired. As a general rule the alpha and beta polyoxymethylenes are of no value for such applications since they are substantially unreactive and dissolve in water so slowly that for practical purposes they may be regarded as being completely insoluble in water. In the coagulation or insolubilization of proteins, paraformaldehyde is too reactive, frequently causing coagulation of the protein during handling. It is generally desirable in most applications that the coagulation, insolubilization, or hardening of the protein-paraformaldehyde composition be prevented from taking place until such composition has been applied to paper, cloth, wood or the like as a coating mixture, or has been molded to shapes which are to be set by the application of heat. The addition to such compositions of various substances for the purpose of controlling the action of the paraformaldehyde has been suggested, but such practice involves additional expense and generally is effective only for specific applications. The use of alpha or beta polyoxymethylenes in place of paraformaldehyde does not solve the problem since such products are entirely too unreactive for practical purposes. The present products, however, are satisfactory for such uses since they have a reactivity between those of paraformaldehyde and the alpha and beta polyoxymethylenes. Furthermore, it is an important advantage of the present process that the degree of reactivity of the product can be controlled to a certain extent by varying the amount of acid employed, within the limits hereinbefore stated, or by varying the temperature during the final stage of evaporation. The use of larger amounts of acid, which amounts should not, however, exceed 0.3%, or the use of temperatures within the upper portion of the range 50–100° C., or both expedients, favors the production of products of lower chemical reactivity, whereas the use of lesser amounts of acid or lower temperatures favors the formation of a more reactive product. Such products may be used with advantage in place of paraformaldehyde in reactions such as the insolubilization of proteins, where a polymer which is less reactive than paraformaldehyde is desired.

The present process is very simple and economical in operation. It gives high yields of polymers and the presence of acid during the final stages of the evaporation treatment when the mixture being evaporated is of a pasty consistency, facilitates the rapid removal of water since polymer formation is accelerated and the precipitated polymer tends to break up quickly to a solid powder. When no acid catalyst is present, for example, in a process for the production of paraformaldehyde, a much longer evaporation time is required and the mixture remains in a viscous semi-solid state much longer than in the present process.

The foregoing examples and specific embodiments of the invention are illustrative only and the invention is not intended to be limited thereby except as indicated in the appended claims.

I claim:

1. The process of preparing a solid polymer of formaldehyde which comprises evaporating an aqueous solution of formaldehyde to substantial dryness at a pressure below atmospheric, said aqueous solution of formaldehyde evaporated being one which contains from 0.01% to 0.3% of a strong non-reactive acid having an ionization constant of at least $1 \times 10^{-2}$, said acid being one which does not volatilize during said evaporation to substantial dryness, and said percentages being by weight, based upon the formaldehyde content of the aqueous solution thereof evaporated.

2. The process defined in claim 1 wherein the evaporation to substantial dryness is carried out at a temperature within the range of 50° C. to 100° C.

3. The process of preparing a solid polymer of formaldehyde which comprises evaporating an aqueous solution of formaldehyde to substantial dryness under a pressure less than atmospheric, said aqueous solution of formaldehyde containing from 0.01% to 0.3% of sulfuric acid, said percentages being by weight, based upon the formaldehyde content of the aqueous solution of formaldehyde evaporated.

4. The process of preparing a solid polymer of formaldehyde which comprises evaporating an aqueous solution of formaldehyde to substantial dryness under a pressure less than atmospheric, said aqueous solution of formaldehyde containing from 0.01% to 0.3% of phosphoric acid, said percentages being by weight, based upon the formaldehyde content of the aqueous solution of formaldehyde evaporated.

5. The process of preparing a solid polymer of formaldehyde which comprises evaporating an aqueous solution of formaldehyde to substantial dryness under a pressure less than atmospheric, said aqueous solution of formaldehyde containing from 0.01% to 0.3% of oxalic acid, said percentages being by weight, based upon the formaldehyde content of the aqueous solution of formaldehyde evaporated.

6. The process of preparing a solid polymer of formaldehyde which comprises evaporating an aqueous solution of formaldehyde to substantial dryness at a pressure less than atmospheric, said evaporation being carried out at a temperature within the range 50° C. to 100° C., and said aqueous solution of formaldehyde containing from 0.05% to 0.15% of a strong nonreactive acid having an ionization constant of at least $1 \times 10^{-2}$, which acid is not volatilized during said evaporation, said percentages being by weight, based upon the formaldehyde content of the aqueous solution of formaldehyde evaporated.

7. The process of preparing a solid polymer of formaldehyde which comprises evaporating an aqueous solution of formaldehyde to substantial dryness under reduced pressure, said evaporation being effected at a temperature within the range 50° C. to 100° C., and said aqueous solution of formaldehyde evaporated containing from 0.05% to 0.15% of sulfuric acid, said percentages being by weight, based upon the formaldehyde content of the aqueous solution of formaldehyde.

8. The process of preparing a solid polymer of formaldehyde which comprises evaporating an aqueous solution of formaldehyde to substantial dryness under reduced pressure, said evaporation being effected at a temperature within the range 50° C. to 100° C., and said aqueous solution of formaldehyde containing from 0.05% to 0.15% of phosphoric acid, said percentages being by weight, based upon the formaldehyde content of the aqueous solution of formaldehyde evaporated.

9. The process of preparing a solid polymer of formaldehyde which comprises evaporating an aqueous solution of formaldehyde to substantial dryness under reduced pressure, said evaporation being effected at a temperature within the range 50° C. to 100° C., and said aqueous solution of formaldehyde containing from 0.05% to 0.15% of oxalic acid, said percentages being by weight, based upon the formaldehyde content of the aqueous solution of formaldehyde evaporated.

JOSEPH FREDERIC WALKER.